Nov. 16, 1954  M. C. MILLER  2,694,306
STOCKING BLANK
Original Filed July 9, 1945  5 Sheets-Sheet 1
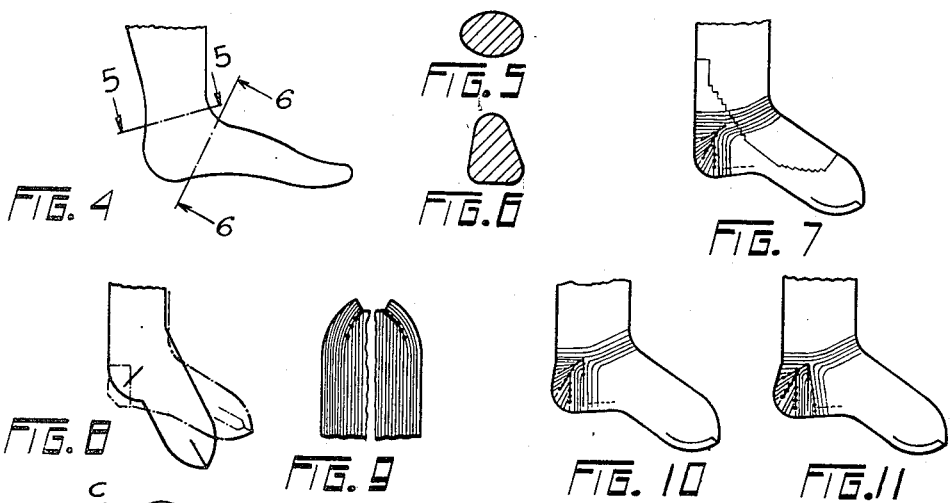
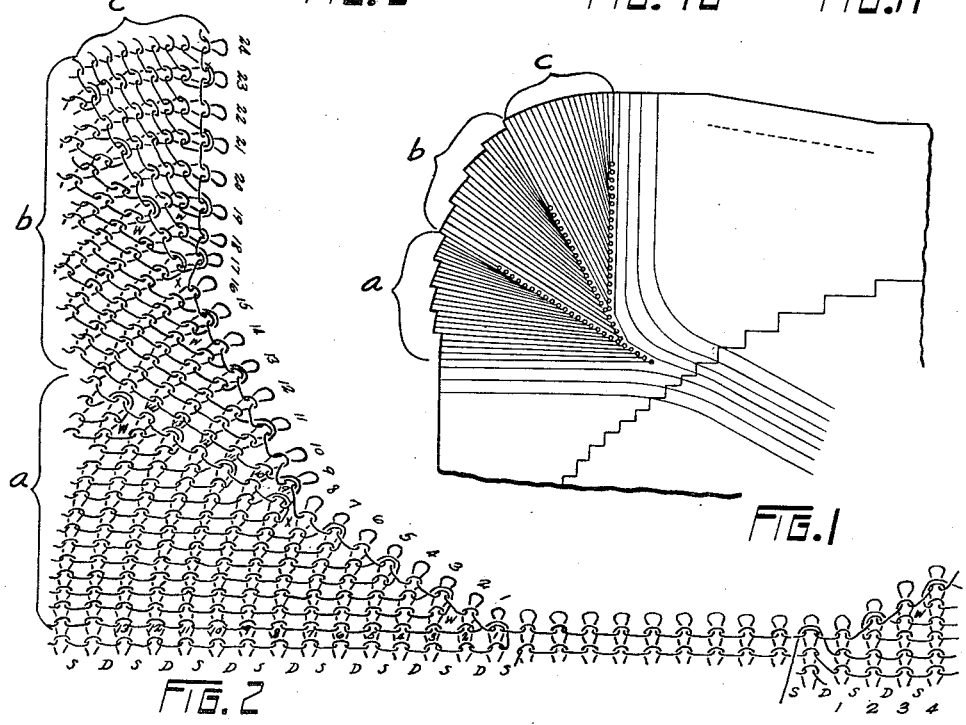
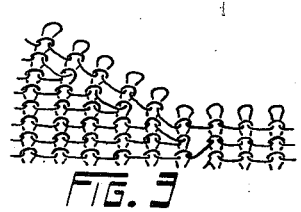
INVENTOR
Max C. Miller, Decd
Ida S. Miller, Exrx
BY Maxwell Fish
ATTORNEY Nov. 16, 1954
M. C. MILLER
2,694,306
STOCKING BLANK
Original Filed July 9, 1945
5 Sheets-Sheet 2
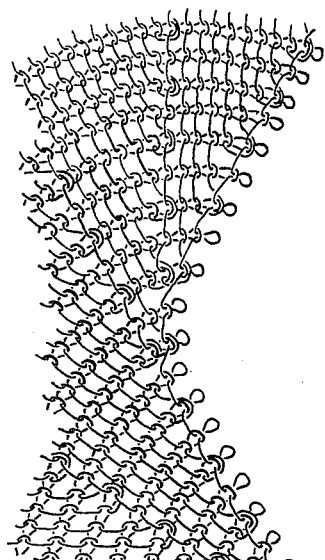
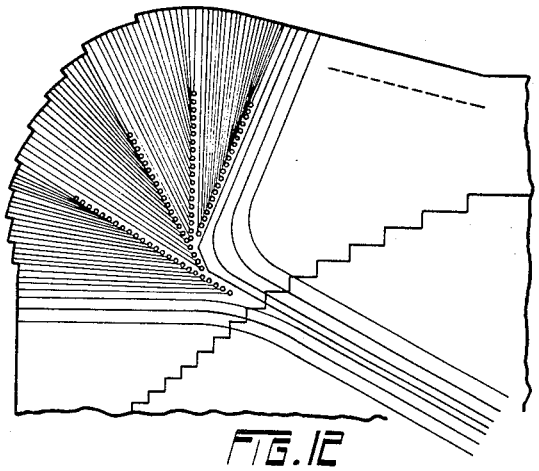
FIG. 12
FIG. 13
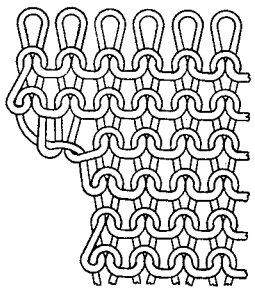
FIG. 14
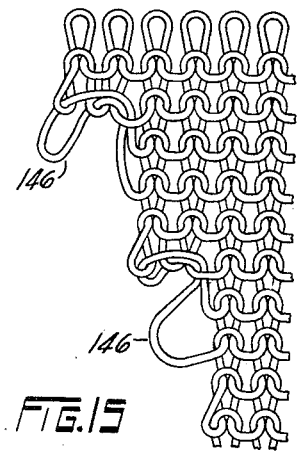
FIG. 15
INVENTOR.
Max C. Miller, Dec'd
Ida L. Miller, Ex'x
BY Maxwell Fish
ATTORNEY

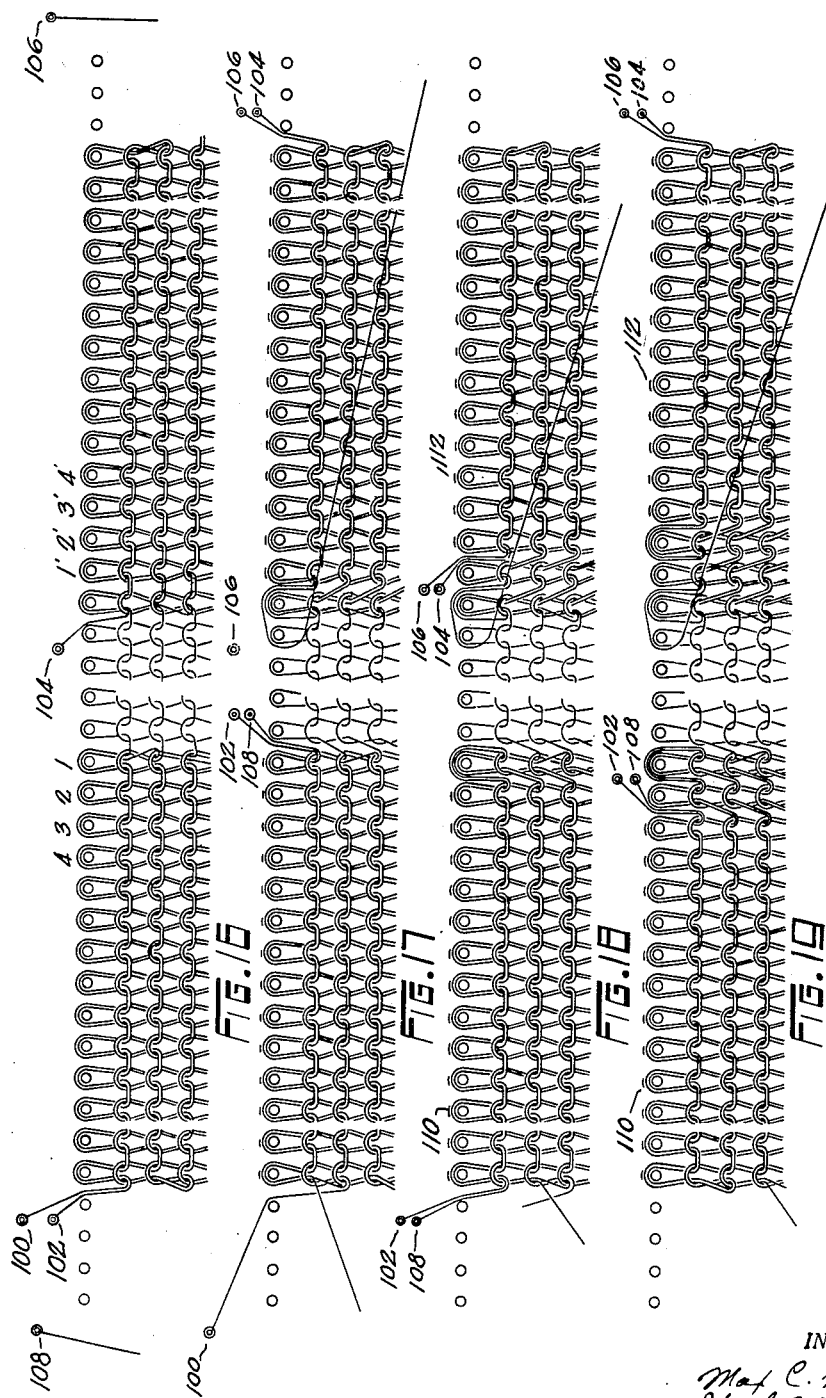

Nov. 16, 1954     M. C. MILLER     2,694,306
STOCKING BLANK
Original Filed July 9, 1945     5 Sheets—Sheet 4
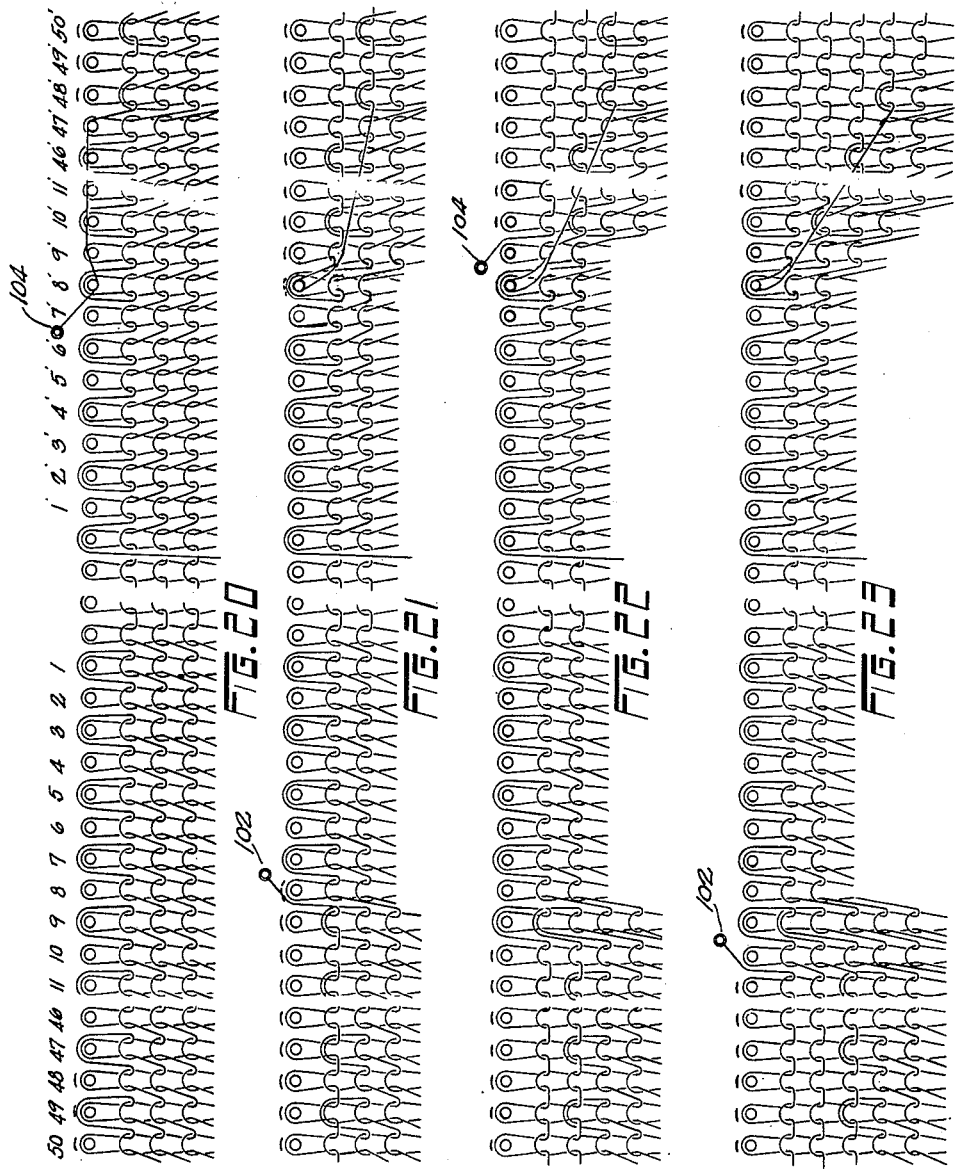
INVENTOR.
Max C. Miller, Dec'd
Ida L. Miller, Ex'x,
BY Maxwell Fish
ATTORNEY Nov. 16, 1954
M. C. MILLER
2,694,306
STOCKING BLANK
Original Filed July 9, 1945
5 Sheets-Sheet 5
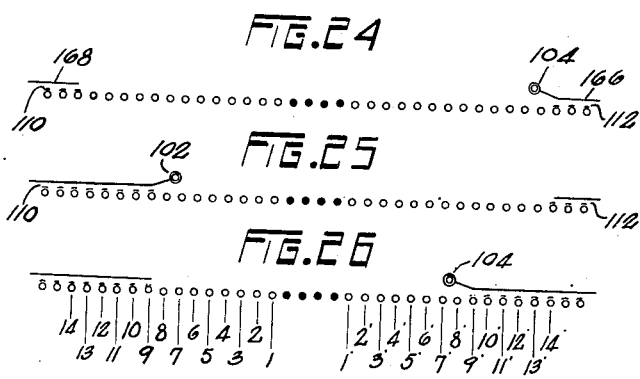
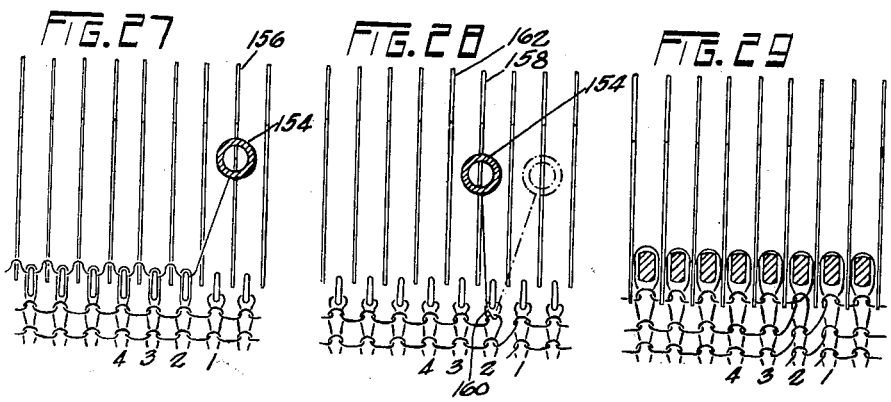
INVENTOR.
Max C. Miller, Dec'd
Ida L. Miller, Exrx
BY Maxwell Fish
ATTORNEY United States Patent Office 2,694,306
Patented Nov. 16, 1954

2,694,306

STOCKING BLANK

Max C. Miller, deceased, late of Cumberland, R. I., by Ida L. Miller, executrix, Cumberland, R. I.

Original application July 9, 1945, Serial No. 603,839½, now Patent No. 2,489,658, dated November 29, 1949. Divided and this application April 22, 1949, Serial No. 90,307

18 Claims. (Cl. 66—187)

The present invention relates to improvements in the manufacture of hosiery, and more particularly to a full-fashioned hosiery blank having a novel and improved heel structure.

Many efforts have been made to produce a fashioned knitted hosiery blank of improved construction to cause the stocking and more particularly the ankle, heel and instep portions to fit more perfectly the human foot, which could be knitted on available flat full-fashioned type hosiery machines, and which would eliminate certain objectionable features of the standard type full-fashioned hosiery blank with square heel sections and ravel end courses to be joined together by looping to close the heel. The fashioned hosiery blank of the present invention is knitted with true heels, that is, heels which are formed while substantially no knitting is taking place over the instep of the fabric. While heel structures and methods have been devised for knitting combination foot and leg hosiery blanks having true heels which attempt to achieve to a greater or less extent the precise shape and style of the so-called full-fashioned stocking, such attempts have thus far failed to produce a hosiery blank which is simple in construction or of the proper shape, or which it is practical to produce on existing machines without adding prohibitively to the complication and cost thereof.

It is a principal object of the invention to provide a full-fashioned hosiery blank having a novel and improved heel knitted therein which is shaped and integrated with the leg and foot in such a manner as to provide a finished stocking of accurate fit, neat appearance and exceptional strength and durability.

It is a further object of the invention to provide an improved full-fashioned hosiery blank of this general description which is readily adapted to be produced upon the basic legger type of full-fashioned hosiery machine most generally employed in the art.

In carrying out the invention, an improved fabric blank is provided which comprises with the ankle and foot sections, left and right hand heel areas formed of a plurality of inwardly tapered gores which are so constructed and so arranged with relation one to another as to provide a heel fabric having the desired relative dimensions of length and width with the lower end thereof rounded, and with the terminal wale loops of the heel and instep fabrics connected by continued knitting to the foot portion of the blank so that an unbroken selvage edge of the fabric is maintained extending from the leg, around the heel and along the foot section of the blank.

Features of applicant's improved heel structure include specifically the construction and arrangement of the heel gores to produce the desired shape and style of heel fabric, the disposition of the gores with respect to one another so that the apex of each successively knitted gore originates in the terminal loop of a different wale of the fabric, the construction of the inner or suture edges of the several gores including the arrangement of the gores so that each gore is formed with a long knitted course connecting the terminal wale loops of the last short course, and the terminal wale loops left during the knitting of the successively shorter courses of the gore, the use of widened courses which are employed at intervals in the knitting of the heel gores to extend outwardly the selvage edge of the heel, the specific arrangement of the loops forming the widened selvage edges to provide a tight, cleanly formed selvage edge, and the construction and arrangement of the left-hand gores with relation to the right-hand gores of the heel fabric.

Another feature of the invention consists in the provision of a combination full-fashioned type stocking blank which consists of applicant's improved heel structure in combination with the foot and leg portions of the blank, in which the heel and foot portions are knitted as a continuation of the leg knitted with a continuous unbroken selvage edge of the fabric extending the entire length of the leg, heel and foot, and in which the initial width of foot fabric produced by knitting the terminal wale loops of the heel and instep portions is reduced by a substantial number of foot narrowings, and in which the toe is produced by further fabric narrowing operations.

In accordance with the preferred form of the invention, a heel structure is provided which comprises a series of from two to four inwardly tapered knitted heel gores of novel construction which are knitted on groups of heel needles at opposite ends of the needle series while knitting is suspended on the intermediate instep needles on which are supported the terminal wale instep loops.

In this preferred form of the invention, the heel gores are formed with courses starting with a maximum length in the neighborhood of fifty to sixty needle wales, which length is sufficient to produce a first course of heel fabric of the required width, and is within the capacity of a narrowing point unit of about sixty points which is the longest such unit that can be accommodated on a standard multiple section legger type hosiery machine. The successively knitted courses of the heel gore are shortened progressively outwardly one needle at a time by the laying of yarn to more outwardly disposed needles only in successive courses until in the neighborhod of forty-five heel needles have been added to the inactive series at each end of the instep group. Further in accordance with the preferred form of the invention, the first long course of the next or second gore is formed with its most inward loop placed from 6 to 8 needle indexes outwardly from the innermost loop of the longest course of the preceding gore, and the first long course of the next succeeding or third gore is located with its most inward loop placed again 6 to 8 needle indexes outwardly from the innermost loop of the preceding gore. During the knitting of the heel courses, the heel yarns are fed outwardly to additional needles in selected courses to form successive two needle widenings. In the example above stated, and as shown in Fig. 1 of the drawings, four such selvage needle widenings will serve to maintain a continuous selvage edge of the fabric from the first to the second and then to the third gore located outwardly with respect to one another as above set forth.

Steps in the operation of a legger-type flat full-fashioned knitting machine to produce a hosiery blank with a shaped heel in accordance with the invention may include knitting series of heel courses upon selected variable groups of needles without resort to needle narrowing or similar loop transfer operations while holding terminal wale loops of intervening instep and heel fabric wales with respect to which no knitting has taken place, and in such manner knitting at each side of the fabric a heel gore with a series of successively shorter courses, thereafter knitting one or more additional heel gores thereto arranged so that the long course forming one side of each gore in the series is employed to connect the terminal loops of heel wales left by the successively shorter courses of the next adjacent gore, and the inner apexes of the several succeeding gores are connected with terminal loops of different wales of the fabric, and at intervals during the knitting of said heel courses adding loops outwardly in selected courses in order to produce the required width and length of heel fabric with a rounded heel and with a continuous selvage edge of said fabric extending from the leg entirely around the heel and thence along the foot portion of the blank, and thereafter knitting a course connecting all of the terminal wale loops of the fabric including the terminal wale loops of the instep and adjacent heel fabric wales with respect to which no knitting has been taking place and the loops of the previous course of knitting to form the first course of the foot portion of the blank.

A full-fashioned machine adapted for knitting my improved hosiery blank together with the steps of the method of operation of that machine, are fully described and illustrated in my copending application for Letters Patent in the United States Patent Office, Serial No. 603,839½, filed July 9, 1945, and issued as Patent No. 2,489,658, dated November 29, 1949, for Manufacture of Knitted Hosiery, of which the present application is a division.

The several features of my improved hosiery blank will be readily understood by one skilled in the art from the following description taken in connection with the accompanying drawings in which:

Fig. 1 is a diagrammatic view on an enlarged scale of the left-hand heel of a stocking blank constructed in accordance with the invention;

Fig. 2 is a fragmentary diagrammatic view showing the loop structure of the three segment left-hand heel of Fig. 1 on a still larger scale;

Fig. 3 is a fragmentary view showing the loop structure produced in accordance with a preferred form of applicant's method of forming the suture;

Fig. 4 is a diagrammatic drawing illustrating the relative dimensions of the foot and ankle of a stocking blank;

Fig. 5 is a cross-sectional view taken on the line 5—5 of Fig. 4;

Fig. 6 is a cross-sectional view taken on the line 6—6 of Fig. 4;

Fig. 7 is a diagrammatic view of the lower portion of a stocking blank showing the three gore heel in accordance with the invention in its relation to the high splicing and sole narrowings;

Fig. 8 is a diagrammatic view in full lines of the lower portion of a seamless stocking blank on which is superposed in dot-and-dash lines, applicant's full-fashioned stocking blank;

Fig. 9 is a diagrammatic plan view of the toe portion of a stocking blank illustrating a simple method of toe narrowing;

Figs. 10 and 11 are diagrammatic views of the ankle and foot portions of stocking blanks in which somewhat different arrangements of the heel gores are shown in accordance with the invention;

Fig. 12 is a diagrammatic view of a four segment left-hand heel of a full-fashioned stocking blank;

Fig. 13 is a somewhat fragmentary view showing on an enlarged scale the loop structure of a four gore heel such as that illustrated in Fig. 12;

Fig. 14 is a fragmentary drawing on an enlarged scale showing a left heel fabric widening operation in accordance with a preferred form of applicant's method in which a true loop is formed on the inner of the two added needles upon the return or reversing stroke of the yarn carrier;

Fig. 15 is a fragmentary drawing showing the loop structure of a left-hand heel selvage widening in accordance with another form of applicant's method;

Figs. 16 to 19 inclusive are a series of somewhat diagrammatic views of the needles, the fabric suported thereon, the beard closing narrowing point units, and the body and heel yarn carriers illustrating the method of operation of the yarn carriers and narrowing point units for the knitting of the first course of the first left and right heel fabric gore in accordance with one form of the invention;

Figs. 20 to 23 inclusive are somewhat diagrammatic views illustrating the fabric, the needles, the left and right heel beard closing narrowing point units, and a left and right heel yarn carrier illustrating the completion of the knitting of one gore and the knitting of the first course of the next succeeding heel gore in accordance with one form of the invention in which the right-hand heel yarn carrier is moved inwardly in advance of its normal operation in order to eliminate the eyelet which would otherwise appear at the anex of the gore suture line of the right-hand heel;

Figs. 24 to 26 inclusive are diagrams showing the relationships of the needles, heel yarn carriers and loop lifting narrowing points in a series of positions to illustrate the operation of these parts at the start of the knitting of a new heel gore;

Figs. 27 and 28 are diagrammaic views illustrating the relation of the sinkers, dividers and the heel yarn carrier to illustrate a preferred method of forming the inner or suture edge of the heel gore to leave a full loop on each successively idled heel needle; and Fig. 29 shows the several cooperating knitting instrumentalities including the needles, sinkers and dividers in position at the completion of the knitting cycle after the yarn carrier has been traversed again outwardly to the left for the knitting of the next succeeding course.

In accordance with the invention, applicant provides a combination foot and leg full-fashioned hosiery blank having knitted therein a novel and improved shaped heel which is particularly adapted to be produced in accordance with applicant's method upon a multiple section full-fashioned legger hosiery machine, and with certain improvements and modifications of structure and operation as particularly set forth in applicant's copending application above referred to, of which the present application is a division. Such reference to the organization of the machine parts and of the method of operation employed will be made herein as is believed necessary for a full understanding of the present invention.

The heel which forms more particularly the subject matter of the present invention, comprises a plurality of successively knitted gores constructed and arranged with respect to one another to produce a heel of the desired width and length in which all terminal wale loops are connected by continued knitting to the foot portion of the blank; and in which unbroken selvage edges are maintained in the continued knitting of the leg, heel and foot.

In the preferred form of the invention, a group of three knitted gores is employed as shown in Fig. 1, designated at $a$, $b$ and $c$, although it is contemplated that a series of from two to four or even more gores can be knitted to produce a heel fabric having the desired characteristics of appearance and shape to fit the human foot. In accordance with the disclosure of Fig. 1, the segments employed take the form of inwardly tapered gores of which the longest course may be 56 loops in length and of which the shortest course may be 18 loops in length in order to provide a sufficient body of fabric adjacent the selvage edge. In the form of the heel shown in Fig. 1, gores "$a$" and "$b$" are formed with widened courses occurring at intervals to form a widened selvage edge, and the successively knitted gores "$b$" and "$c$" are preferably located successively outwardly each with respect to the preceding in order to give the heel its characteristic shape and appearance. It will be understood that the shape of the fabric produced in accordance with the invention is flexible within wide limits, and may be readily altered by varying the amount of the widening at the selvage edge and by altering the number and relative positions of the gores. In the preferred form of the invention, a heel having a length approximately one and a half times the width and consisting of three gores is employed substantially as shown in Fig. 1, and provides a most satisfactory form of heel. In this connection, reference may be had to Figs. 4, 5 and 6 of the drawings, which disclose a model of the human foot of standard proportions, Fig. 5 being a cross section across the ankle to illustrate the amount of fabric which is employed in the forming of the upper end of the heel, and Fig. 6 being a cross section taken across the instep and foot at the point of juncture of the heel therewith to illustrate the somewhat greater amount of fabric required at this point in the knitting of the stocking blank. The difference in the length of outline of Figs. 5 and 6 indicates that a heel having a length of substantially one and a half times its width is required to produce a properly fitting stocking.

Further in accordance with the preferred form of the invention, it is contemplated that the several gores will be knitted in a substantially similar manner starting with the long course and proceeding with the knitting of successively shorter courses, the terminal wale loops left by the successively shortened courses and the terminal wale loops of the last short course being connected by the first long course of knitting of the next succeeding gore. Figs. 7, 10 and 11 illustrate respectively alternate forms of heel in which three, four and five gores respectively are employed in the knitting of the heel. Fig. 8 illustrates in solid lines, for purposes of comparison, a bag-type heel in which no widening of the fabric gores is employed, so that an undesirable downward dip is produced in the shape of the foot as compared with the preferred shape illustrated in dot-and-dash lines in this figure. The heel knitted in accordance with the invention is a true heel in that little or no fabric is formed across the instep during the knitting of the heel gores, although it is contemplated that an occasional course as, for example, one or several courses following the knitting of each successive gore may be so knitted across the entire width of the fabric in order to avoid marking of the fabric through straining of the held instep loops. Further, by including such courses, it will be understood that a different construction of the heel gores with relation to one another may be employed without the forming of objectionable eyelets such as those produced where gores are formed in pairs by the knitting of successively shorter courses for the formation of one gore and successively longer courses for the formation of the next succeeding gore to produce the bag heel of Fig. 8. It will be understood that the machine of applicant's copending application referred to is well adapted for the knitting of such interposed courses extending across the entire width of the fabric upon completion of the knitting of a right and left gore and prior to the knitting of the next succeeding right and left gore. The procedure is to render the heel knitting mechanism inoperative and to put in operation a body carrier which will then knit entirely across the fabric in the manner set forth on the last page and paragraph of the specification for the knitting of the first course of foot fabric. For the knitting of the first course of the next succeeding right and left gore, the heel knitting mechanism is again placed in operation in the manner set forth for the knitting of the first left and right heel gore. Assuming that such full length courses are interposed between successive gores, it will be understood that the advantages of the invention may be obtained from knitting any one or more of the gores located with relation to one another and formed with widened selvage edges as above set forth, but starting with the shortest rather than the longest course as here shown, and thereafter knitting successively longer courses adding active needles at the inner or suture edge of the gore.

Certain features of applicant's improved heel relate to the construction and arrangement of the loops forming the inner or suture edge of the successively knitted heel gores in which the terminal wale loops left on inactive needles during the knitting of the successively shorter heel gore courses are subsequently joined to the fabric by the knitting of a long course connecting therewith, and other features relate to the provision of an improved loop structure forming the widened selvage edges of the successively knitted heel gores. In accordance with one form of the invention as shown, for example, in Figs. 1 and 2 of the drawings, the inner or suture edge of each heel gore formed by the juncture of the terminal wale loops of successively shortened heel courses with a following long connecting course is knitted with alternate plain and tucked loops in successive courses. An alternative and, it is believed, preferable form of suture is illustrated in Fig. 3, in which a true loop is formed and is left in the knitting of each successively shortened course of the heel gore to form a less marked suture line. Further details of these constructions will be pointed out in connection with the description of the method of knitting the heel gores.

In accordance with the invention, applicant provides an improved loop structure providing a two-needle widened selvage edge of the heel gores. In each of the two constructions shown in Figs. 14 and 15 of the drawings, the yarn is laid to the needles in such a manner as to cause a loop to be formed upon the inner of the two added needles, and a loop to be formed upon the outer of the two added needles during the second or reverse course of yarn laying from the widened selvage on the selvage needle by wrapping the yarn around the selvage needle. In one form of the invention shown in Fig. 15, the loop formed on the inner of the two added needles is tucked in the first or widened course and is tucked again together with the second loop formed in the return or reverse course, and a true loop is then formed as the yarn carrier again returns to the selvage adge for the laying of the third course upon the wider group of needles. With this form of selvage, the wales forming the widened fabric area are properly locked into the fabric at the point of starting, but the tucking of the yarn in the two successive courses upon the inner or first added needle is one cause for the leaving of an undesirable amount of slack yarn, as shown in Fig. 15. In the alternative and preferred construction of Fig. 14, it will be noted that a true loop is formed in the return course of knitting away from the widened selvage edge. As will hereinafter appear in connection with the following description of the several steps of applicant's method, this difference in loop structure is effected by causing the first added needle to cast off the widening course yarn kink during the second or reverse course of knitting of the carrier away from the selvage edge. With this form of loop structure shown in Fig. 14 and knitted in accordance with the method hereinafter more fully set forth, an extremely firm and compact fabric selvage edge is achieved at the point of widening.

A further feature of applicant's improved fabric blank consists in the construction and arrangement of the knitted fabric with right and left gored heels produced simultaneously on a standard type flat hosiery machine in which the coulier stroke in either direction cooperates with the needles and associated knitting elements including sinkers and dividers in a different manner for the knitting of the left and right heel courses. In accordance with one form of the invention in which it is proposed to knit the first course of heel fabric simultaneosuly for the formation of both the left and right heels, the first course of knitting of each successive gore in the formation of the right-hand heel, assuming a carrier traverse from left to right, will be formed with the yarn at its starting end intertwined with one or preferably a substantial number of adjacent instep or previously inactive heel course loops in order to close the eyelet which would otherwise be formed at the inner apex of each right-hand heel gore. Further, in accordance with one form of the invention in which the heel gore sutures are formed with alternate loops and tucked loops on the reversing needles, it will be noted that these tucked loops appear for the left- and right-hand heel sutures in staggered alternate courses, as also do the two-needle selvage edge widened courses for the left and right heels. In an alternative form of the invention, the left and right heels are formed with the corresponding courses in the left and right heels out of step with one another by one course, the first course of left-hand knitting being one course in advance of the first course of right-hand knitting, this correspondence being maintained during the entire knitting of the heel. Further details of the construction of the heel fabric above mentioned will appear in connection with the following description of the various forms of applicant's method of knitting a fabric with his improved heel.

Further in accordance with the invention, the stocking blank produced is formed with a continuous unbroken selvage edge which extends from the leg or ankle portion of the blank around the entire heel, and joins with the leg and foot. The looping operation normally employed for securing together the ravel ends of heel tabs produced in the knitting of the ordinary full-fashioned stocking blank is entirely eliminated, and the operator is enabled to seam around the entire heel edge with a consequent saving in time and improvement in appearance and strength of the completed article. A heel knitted with a series of gores constructed and arranged as herein set forth is curved at its lower end and tends to assume a pouch-like shape so that it fits more accurately the rounded shape of the human foot than the ordinary full-fashioned heel construction normally employed.

The heel structure of the present invention combines in an improved manner with the leg and foot sections of the blank to form a more perfectly fitting stocking. It will be understood that the rounded heel of the present invention may be finished off when so desired with narrowing courses to further enhance the pouch-like shape of the heel, and it is contemplated that in the knitting of the foot section of the blank, further shaping of the foot fabric will take place, being produced by means of foot narrowings which are in accordance with the usual practice except that a substantially larger number of such narrowings have been found desirable to properly narrow the foot in view of the greater fullness of the heel structure produced in accordance with the present invention. The elimination of the usual looping operation to close the heel and the substitution of a continuous seaming operation therefor extending the full length of the leg, heel and foot fabrics makes possible a closer and more accurate shaping of the blank and particularly the heel and foot to a predetermined standard shape.

For the knitting of the inwardly pointed or shaped toe portion of the hosiery blank, a series of two-needle narrowing operations may be employed to produce a toe utilizing the left and right narrowing point units which are employed also for the leg narrowings and for closing the beards of the heel needles during the knitting of the heel fabrics above set forth. Since the use of narrowing operations of this character to form the shaped toe of a hosiery blank is well known in the art, no further description of the knitting of the toe is necessary.

In order that the several features of construction and arrangement of applicant's improved stocking blank having the shaped knitted heel above described may be more fully understood, the several steps of applicant's method of knitting the heel fabric above described on a Cotton type full-fashioned hosiery machine as more fully set forth in applicant's copending application above referred to, will be briefly described as follows:

In accordance with the method referred to, the shaped heel fabric portions of the blank are produced by knitting on selected groups only of the needles comprising each knitting section, these groups being located toward the outer ends of the needle series, and by adding needles to and subtracting needles from the groups upon which knitting is taking place in accordance with a predetermined pattern while the terminal wale loops of the instep portion of the fabric and the terminal wale loops left by the successively shortened heel courses are held on the inactive instep and adjacent heel needles as these are added to the inactive series.

Further in accordance with applicant's method, the shaping of the heel fabrics is effected solely by the control of the heel yarn carriers to feed yarn to selected numbers of needles in successive courses, and without resort to loop transfer operations of any description. The heel needles are caused to take yarn and to knit successive heel courses while the intervening inactive instep needles and heel needles added to the inactive series remain inactive with their terminal wale loops held thereon by a novel cooperation of the knitting instrumentalities of the machine which includes the employment of narrowing points as needle beard pressing elements in a knitting cycle of operation with the needles, the narrowing points being mounted in units of a width equal to the width of heel fabric knitting, and a novel arrangement and mode of operation of cooperating nibbed knockover bits for knocking over and positioning the newly formed fabric loops to the backs of the needles, and for holding down the loops held on inactive needles without injury thereto.

In accordance with applicant's method, racking movements are imparted to the narrowing point units, and cooperating adjustments are made in the positions of both the inner and outer carrier stops for the heel carrier needles for the knitting of the successive heel courses including the rapid positioning inwardly of the narrowing point units and inner carrier stops for the knitting of the first long course of each successive gore. A novel system of control of the right and left heel carriers and of the narrowing point units associated therewith is provided to facilitate the simultaneous knitting of right and left heel fabrics on a flat full-fashioned type hosiery machine.

Further in accordance with the method employed to produce applicant's improved fabric, stepped positioning movements outwardly are imparted to the heel yarn carriers subsequent to the normal yarn laying stroke thereof for effecting periodic two-needle widenings of the fabric selvage, and also for feeding yarn to more outwardly disposed needles at the inner edges of the heel knitting for the formation of the successively shorter courses of the heel gores.

In a preferred form of the method employed, the gores comprising successively shortened courses are formed by a single stepped outward racking of the beard closing narrowing points upon the knitting of each course accompanied by a two-stepped outward racking of the carrier stops for the carriers forming the heels upon alternate courses. The courses are widened as desired at the outer ends by moving the outer carrier stops outwardly to add two needles at a time in the knitting of selected courses.

The several steps of the method of knitting the improved shaped heel of the combination foot and leg full-fashioned hosiery blank in accordance with the present invention will be described as follows:

As shown in Fig. 2, the heel is formed of three segments or gores a, b and c respectively. Segment a is the first portion of the heel to be formed, and consists essentially of a gore in which the starting course is of a predetermined width. It is assumed that the illustrated machine is a 45 gauge machine, and that the first knitted heel course is 56 needles wide. This segment or gore is formed one needle narrower at the end of each course, the yarn of each inward stroke in accordance with one form of the invention forming a double loop on a reversing needle which is always selected so that there is a jack sinker immediately adjacent and inwardly thereof to insure that the reversing needle can have yarn fed to it properly. On the subsequent outward carrier traverse, this reversing needle does not have its beard closed so that it forms a tuck stitch in the following course. All of the remaining needles to which yarn is fed including the next outwardly adjacent needle form loops in the normal manner. During the next inward traverse of the carrier, yarn is fed to a reversing needle two needles outwardly removed from the first reversing needle, and again on the reverse outward stroke of the carrier, the yarn is tucked on the reversing needle while the remaining outwardly disposed needles form loops in the normal manner. At intervals during the knitting of the heel course of gore a, the fabric is widened outwardly at the selvage edge in order to impart to the finished heel fabric the desired characteristic shape, and to provide a continuous selvage edge connecting with the next succeeding similarly formed outwardly disposed gore b. For widening at the selvage, the empty needles are added two at a time at the outer end of the active group at recurring intervals as shown in the drawing Figs. 1, 14 and 15.

After forming the first segment or gore a with, for example, 47 successively shortened courses in which 47 needles are rendered successively inoperative at the inner selvage for the left-hand wheel, and with four fabric widenings so that, for example, 18 loops are left in the last short course, the second heel segment or gore b is formed, the first or inward traversing course of which goes to a reversing needle, let us say, the ninth needle outwardly from the first reversing needle employed in knitting the first heel segment, and thereafter, the fabric gore b is formed in the same manner as gore a above described, until knitting has again taken place through 47 successively shortened courses up to the 47th reversing with 47 needles having been rendered successively inoperative at the inner selvage or suture edge of the heel fabric, thereby completing the second heel segment with an outward carrier traverse from the 47th needle, empty needles again being added at the outer end of the active group at recurring intervals as indicated in Fig. 1 of the drawing.

Thereafter the third heel segment or gore c is knitted. Commencing at the outer selvage for the left-hand heel, the traverse goes to a reversing needle which may be taken as the 17th needle counting outwardly from the first reversing needle of the first heel segment or gore a, and thereafter this third segment or gore c is formed in a manner similar to that described for the first and second gores a and b respectively, until the knitting to and from the reversing needles forming progressively shorter courses of the gore has progressed so that there are only, for example, 18 needles active. This completes the knitting of the heel, and the first sole course is now formed, feeding from left to right across the left-hand heel through the instep and then across the right-hand heel which has been knitted simultaneously with the knitting of the left-hand heel.

Figs. 16 to 19 inclusive, illustrate in diagrammatic form a system of carrier control in accordance with the invention for the simultaneous knitting of the first course of left and right heel fabrics during the same coulier stroke of the machine, and for causing the yarn at both inner heel selvages to be knitted immediately into the instep portion of the fabric held on the inactive instep needles and thus to avoid the formation of an objectionable eyelet hole particularly in the inner corner of the right-hand heel gore. At the completion of the slur-cock stroke from right to left in the last course of leg fabric prior to the knitting of the heels, the positions of the active yarn carriers will be as shown in Fig. 16. The leading yarn carrier designated at 100 is standing at the outer edge of the left-hand splicing and will be placed in an idle position before the next traverse of the slur-cock. The left-hand splicing carrier 102 is standing at the outer edge of the left-hand splicing, while the right-hand splicing carrier 104 is standing at the inner edge of the right-hand splicing. At the right and left idling positions are the carriers 106 and 108 respectively that are to be used as reinforcing yarn carriers in the following traverse from left to right.

Before the knitting of the last course is completed, however, the machine is stopped with the needles down and the sinkers retracted, at the knocking-over position. The carrier 106 is now traversed manually to the position shown in dot-and-dash lines in Fig. 17, so that in the following traverse from left to right, the two right-hand carriers 104 and 106 lay yarns from the inner edge of the right-hand splicing outward so that this course is in effect the first course of heel knitting for both the left and right heels. This is the position shown in Fig. 17. The object of manually moving the carrier 106 to the dot-and-dash position of Fig. 17 is to lay a connecting yarn starting preferably several needles inwardly from the edge of the instep portion of the fabric so that it will extend across to the heel knitting needles, and thus avoid the formation of a large eyelet hole which would otherwise appear at the inner selvage of the right-hand heel. Prior to the knitting of the course shown in Fig. 17, the body carrier 100 is moved to an idling position, while the carrier 108 shown idle in Fig. 16 is rendered active, and in the knitting of the course shown in Fig. 17, functions as one of the two left-hand splicing carriers.

Prior to the knitting of the first heel course of Fig. 17, the machine is conditioned for the knitting of the shaped heel fabrics while the terminal wale loops of the instep fabric are held with no further knitting taking place on the instep needles. The left-hand narrowing point unit 110 and the right-hand narrowing point unit 112 are now moved simultaneously inwardly to the positions shown in Fig. 17 to be used as beard pressers. Other changes in the operating condition of the machine taking place at this time, as set forth in applicant's copending application above referred to, include the shifting of the narrowing machine beard pressing cams, shifting of the needle in-and-out motion idling cams to active position, setting of the inner carrier stops, and starting of the racking means for the narrowing point spindles and inner carrier stops to start the formation of the first heel course.

The right and left beard closing narrowing point units 110, 112 are racked outwardly simultaneously one needle after the knitting of each successive course. The inner carrier stops are racked outwardly two indexes at a time after the knitting of each alternate course so that the carrier will always stand at reversal over a dividing sinker.

The second course of heel fabric in which no knitting takes place on the instep portion of the blank is knitted as shown in Fig. 18, with the traverse of the slur-cock and heel carrier from right to left. As shown in this figure, the points of the beard pressing narrowing point units 110, 112 are still aligned with the needles whose beards they have just pressed in the formation of this course. It will be noted that the innermost narrowing point 110 of the left-hand series is aligned with the "2" needle so that a tuck stitch was formed in the "1" or reversing needle having a jack sinker immediately inwardly or to the right thereof. Since there is a dividing sinker immediately inwardly or to the left of the "1'" needle forming the right-hand heel, the reversing needle for the right-hand heel will be the "2'" needle of that group.

Prior to the formation of the next course, the narrowing point spindle is racked outwardly one index, and the third heel course is then knitted as shown in Fig. 19, the slur-cock and heel carriers being couliered from left to right. Thereafter the heel gore "a" is formed by continued knitting of successively shortened courses, the "1," "3," "5" etc. needles knitting the left-hand heel acting as reversing needles of that series, and the "2'," "4'," "6'" etc. needles knitting the right-hand heel acting as reversing needles of that series.

At intervals during knitting of the heel fabrics, needles are added at the outer end of the series to knit the widened courses illustrated particularly in Figs. 1 and 12.

In accordance with the preferred form of the invention, a novel method is provided for varying the length of successively knitted courses of the heel gore by one loop at a time and without tucking to form the inner or suture edge thereof on the conventional Cotton-type full-fashioned hosiery machine having alternating sinkers and dividers and a yarn carrier system adapted for stopping the traverse of any carrier over a divider only. The structure of the fabric produced in accordance with this preferred form of the method has been previously described and is illustrated in Fig. 3 of the drawings. The steps of this form of the method for forming the inner or suture edge of the heel gores will be readily understood in connection with Figs. 27, 28, 29 and 3 of the drawings. In the knitting of the first heel course as shown in Fig. 27, the yarn carrier designated at 154 is stopped at the end of its left to right traverse over divider 156 so that no yarn is fed to the number one needle, and yarn is fed in the normal manner to the number two needle. As shown in Fig. 27, the beards of the active needles of the outwardly disposed series numbered 2, 3, etc. of the group engaged in the knitting of the heel gore have been engaged and pressed by the beard covering narrowing points, while the number one needle is permitted to retain its loop. After the needles have pressed and when the sinkers have been retracted to about the fabric level, the machine is stopped and the yarn carrier 154 is shifted outwardly or to the left two indexes to the position in Fig. 28, where the carrier is shown over the next outwardly disposed divider 158, the yarn leading downwardly from the carrier to the loop of yarn 160 which has been formed on the number two needle. The yarn carrier is now in a position to lay the yarn over the noses of the divider 158 and the next outwardly disposed jack sinker 162 upon the next or reverse coulier stroke from right to left of the yarn carrier 154 so that the yarn from carrier 154 will be caused to be kinked first around the number three needle in the formation of this next course. In the next following course in which traverse of the carriers is from left to right, the carrier will stop over the divider 158 so that the terminal loop of said third course will be located on the number four needle, and as the yarn carrier is again transferred two indexes prior to the return stroke, the terminal wale loop of the next succeeding or fourth heel course will have its terminal loop on the number five needle.

Further in accordance with applicant's novel method of knitting the shaped heel of a combination foot and leg hosiery blank in accordance with the invention, a novel and improved procedure is employed for the knitting of a first long course of a heel fabric gore following the completion of the last short course of a previous fabric heel gore. In this specific case, where the last knitted course of the previously formed heel gore was knitted on a small group of heel needles toward the outer ends of the needle series with the beard pressing narrowing points racked correspondingly outwardly and with a substantial number of the heel needles inwardly considered adjoining the instep needles having been rendered inactive, the knitting of the first long course of the next heel gore requires that a substantial number of the previously idled needles be added to the active group of heel needles inwardly toward the instep portion of the needle series. In order to carry out this operation, it is required to move the beard pressing narrowing point units inwardly a large number of indexes subsequent to the completion of the last short course of the previous gore and prior to the knitting of the first long course of the new heel gore. In the preferred form of applicant's method, it is proposed to move the left and right heel beard pressing narrowing point units inwardly simultaneously, and to employ the usual point indexing spindle for this purpose. Inasmuch as the operation of the carriers is not similarly symmetrical, and the knitting of a first course of heel gore fabric during the traverse of the slur-cock from left to right is effective to form a true first course only on the left-hand heel, the first true heel fabric course for the right-hand heel being formed during the subsequent traverse from right to left, an important step of applicant's improved procedure consists in the manipulation of the carrier to cause knitting to take place properly during the knitting of the first course to avoid casting off of loops or other difficulty which might arise through the premature moving in of the right-hand heel group of beard pressing narrowing points. Specifically, in accordance with the improved procedure here set forth, it is proposed to so manipulate the carriers and carrier stop mechanisms as to provide for the knitting of a first long heel course on the right-hand group of heel needles simultaneously with the knitting of the first long course on the left-hand group of heel needles during the traverse from left to right, and at the same time to provide such a connection with the idled inwardly extending heel and instep needles as to insure a firm and tightly knit fabric about the inner tip of the gore and to avoid the formation of objectionable eyelet holes.

The details of the procedure followed are specifically set forth in a series of diagrammatic views Figs. 20 to 23 inclusive of the drawings. In Fig. 20, the beard pressing narrowing points are shown in the position assumed at the completion of the knitting of the last narrowed course of heel fabric formed in the knitting of the first heel gore, the needles having pressed and drawn down the new loops, and the beard pressing narrowing points being shown clear of the needles. The innermost narrowing points of the two groups of heel beard pressing narrowing points are shown opposite the 48 and 48' needles respectively. For the knitting of the next or first long heel course for the formation of the next succeeding gore, it is proposed to add inactive needles inwardly of the active heel needle series to include needle 9 in the left-hand heel series, which because of the location of a jack sinker inwardly thereof will be the first reversing needle of the new series, and on the right-hand needle series the 10' needle which will be the first reversing needle by virtue of the position of a jack sinker immediately inwardly thereof.

The first step of this operation in accordance with applicant's improved procedure consists in the relocation of the inner carrier stop for the right-hand heel. During the knitting of the next to last course of the preceding gore in which the coulier takes place from left to right, the inner carrier stop for the right-hand heel carrier is shifted inwardly so that during the subsequent traverse from right to left, yarn will be fed to needle 8'. Fig. 20 shows the positions of the parts for the completion of the last short course of heel fabric in the knitting of the first heel gore. It will be noted that the right-hand heel carrier 104 has moved inwardly against its stop located as above noted, so that it stands over the divider between the 6' and 7' needles in a position to feed yarn to the 8' needle having a sinker disposed inwardly thereof. Since in the knitting of this last short heel course of the previous gore there are no beard pressing points opposite the 8' to 48' needles so that these needles do not press, a float of yarn will be formed except that with respect to the last of the added needles, that is, needle 8', the yarn will be located to the back side of the needle by the action of the sinker disposed between the 8' and 7' needles. The manner in which the yarn is laid as shown in Fig. 20, will be clear from a consideration of Fig. 27, for example, in which the yarn is similarly located to the back side of an end needle.

Prior to the knitting of the next or first long heel course of the next heel gore, the two groups of heel knitting beard pressing narrowing points are moved rapidly inwardly so that the innermost points of the two series are opposite respectively to 8 and 8' needles as shown in dotted lines in Fig. 21. The point spindle is then racked one index prior to the pressing of the needle beards, so that the innermost points are located respectively opposite the 9 and 9' needles, this outward racking having the effect of properly registering the points with the needles. Fig. 21 specifically shows the position of the parts at the completion of the first long course of the new heel gore in which the left-hand heel carrier 102 has completed its traverse from left to right feeding yarn to reversing needle 9. Simultaneously the traverse of the right-hand heel carrier 104 from left to right has caused the yarn to be wrapped about needle 8' and the first loop to be formed on needle 9'. During the knitting of the second heel course in the traverse from right to left, the narrowing point spindle is again racked to move the points outwardly one index so that a reversing loop is left on the now inactive 9 needle, and a loop is formed in a normal manner on the 10 needle. During this traverse from right to left, the right-hand heel carrier 104 will have moved inwardly to feed yarn to the 10' needle which will then become the first reversing needle in the formation of the second right-hand heel gore. From this point on the knitting of the gore proceeds in the normal manner as previously set forth. The same procedure will be again followed in the knitting of the long course of each successively formed gore until the heel is fully knitted.

It is contemplated that an alternative procedure may be followed if so desired for the knitting of that portion of the heel which includes the knitting of a first long course of a left-hand heel gore following the knitting of the last short course of a preceding gore out of step with the knitting of the first long course of the right-hand heel gore. The procedure which it is proposed to follow in this alternative form of applicant's method includes the inward movement of one narrowing point unit and operation of said unit in the inner position one course in advance of the inward movement and inward operation of the other narrowing point unit. This procedure will be particularly described in connection with diagrammatic Figs. 24, 25 and 26 of the drawings, in which the heel needles are indicated as open circles, and the instep needles are indicated as solid black disks. The right heel yarn carrier 104 is shown in Fig. 24 at the inner end of its stroke prior to the knitting of the last short course of the previously knit heel gore for the right-hand heel. This view shows the last short knitted course for the left-hand heel. The yarn laid by the right-hand heel carrier is designated diagramatically at 166, and the yarn laid by the left-hand heel carrier 102 in the knitting of this course is designated at 168. The beard covering narrowing points cooperating with the needles knitting the left-hand heel are designated as in previous views at 100, and the beard covering narrowing points of the group associated with the needles for the knitting of the right-hand heel are designated at 112. The position of the parts in Fig. 24 is assumed to be that which would be taken upon the completion of the knitting of the last course when the yarn designated by the lines 166 and 168 has been formed into loops, and the beard covering narrowing points have again moved away from the needles. Prior to the knitting of the next course with the coulier from left to right which will be the first course in the knitting of the new heel gore, the group of narrowing points 110 is moved inwardly so that the innermost point will cover needle 9, and the left-hand heel inner carrier stop is adjusted so that during this traverse from left to right in the knitting of this course, the left-hand heel carrier 102 will stop over a divider located between the 8th and 7th needles to feed yarn to the 9th or first reversing needle of the new gore. In this form of the method, the narrowing points 112 of the group associated with the needles knitting the right-hand heel are permitted to be stepped outwardly again one index to form one additional short course in the right-hand heel. Prior to the knitting of the next succeeding course from right to left, the narrowing points 112 of the right-hand group are shifted inwardly in a similar manner. The mechanism for effecting these shifting movements of the narrowing points, forming specifically no part of the invention, is not here specifically described. For a full description of this mechanism, reference may be had to the disclosure in applicant's copending application above referred to.

For purposes of illustration of the method, it may be stated that the narrowing point supporting bar for supporting the group of narrowing points 110 associated with the left-hand heel needle group is moved inwardly away from its normal contact with the stop abutment forming part of the left-hand narrowing point control nut mounted on the narrowing machine racking spindle, and is then latched in its inner position by means of a manually operable latch lever. Prior to the knitting of the second heel course of the new gore with a coulier from right to left, the narrowing point spindle is rotated to shift the narrowing spindle nuts rapidly inwardly, so that the innermost narrowing point 112 of the right-hand series is positioned over the 9' needle, and the spindle is then racked one index outwardly so that the first needle covered by the innermost narrowing point of the right-hand series will be the 10' needle. At the same time the latch above referred to holding the points 110 of the left-hand series is released so that these points may be similarly shifted outwardly one index to uncover needle 9.

Fig. 26 shows the position at the completion of the knitting of the second course in the formation of the new heel gore in which two courses of heel fabric forming the new gore have been knitted as to the left-hand heel, and one such course has been knitted in the formation of the right-hand heel.

The procedure above described may be employed also for the knitting of the first course of the first gore for the left-hand heel one course in advance of the knitting of the first course of the first gore for the right-hand heel. For the knitting of the first course for the left-hand heel the left narrowing point unit is brought in while the right-hand unit remains in an inoperative position beyond the active needle range.

The invention having been described, what is claimed is:

1. A stocking blank comprising an ankle portion, a foot portion and right- and left-hand heel areas, each such area comprising series of short courses forming a number of inwardly tapered gores, the series of courses forming each gore being successively shortened, and alternate courses of the series being formed with the innermost loop thereof tucked over the innermost terminating loop of the next preceding course which forms also the terminating loop of the adjacent next inwardly considered wale.

2. A stocking blank comprising an ankle portion, a foot portion and right- and left-hand heel areas, each such area comprising series of short knitted courses forming a number of inwardly tapered gores, the series of courses forming each gore being successively shortened, and alternate courses of the series being formed with the innermost loop thereof tucked over the innermost terminating loop of the next preceding course which forms also the terminating loop of the adjacent next inwardly considered wale, and certain of said courses having loops added at the outer selvages to form heel fabric areas of substantially even width.

3. A stocking blank comprising an ankle portion, a foot portion and right- and left-hand heel areas, each such area comprising series of short knitted courses forming a number of inwardly tapered gores, and with the first course of each successively knitted gore having its innermost loop starting on a wale other than the wale which supports the innermost loop of any preceding gore.

4. A stocking blank comprising an ankle portion, a foot portion and right- and left-hand heel areas, each such area comprising series of short courses forming a number of inwardly tapered gores, courses of the series forming each gore being successively shortened so that the innermost loop of each successive course forms the terminating loop of the next adjacent outwardly considered wale and certain of said courses having loops added at the outer selvages to form heel fabric areas of substantially even width, and with the longest course of each successively knitted gore having its innermost loop starting on a wale other than the wale which supports the innermost loop of any preceding gore.

5. A stocking blank comprising an ankle portion, a foot portion and right- and left-hand heel areas, each such area comprising a number of inwardly tapered gores constructed and arranged so that the innermost loop of the longest course of each successively knitted gore forms the terminating loop of a wale located outwardly of the fabric from the supporting wale for the innermost loop of any preceding gore.

6. A stocking blank proportioned to be produced on a multiple section legger type full-fashioned hosiery knitting machine, comprising an ankle portion, a foot portion and right- and left-hand heel areas, each area comprising a series of short knitted courses arranged to form three inwardly tapered gores, the first of said gores including an initial long course approximating 50 to 60 loops, series of courses shortened successively at their inner ends by one loop each, and with certain of said courses having loops added at the selvage to a total number in the order of eight to twelve loops to produce a widened selvage edge of the gore, and a last short course of a length in the order of 16 to 20 loops, the second gore being similarly constructed and having an initial course of a length in the order of 50 to 60 loops extending inwardly from the selvage edge of the heel area, and with the innermost loop thereof terminating in a wale outwardly disposed from the innermost loop of said first gore, and the third gore consisting of an initial course of a length in the order of 50 to 60 loops extending inwardly from the selvage edge of the heel area and with the innermost loop thereof terminating in a wale outwardly disposed from the innermost loop of said second gore, and a series of courses shortened successively by one course each to form the rounded lower end of the heel, and a first foot course extending from one heel selvage edge to the other heel selvage edge.

7. A stocking blank proportioned to be produced on a multiple section legger type full-fashioned hosiery knitting machine, comprising an ankle portion, a foot portion and right- and left-hand heel areas, each area comprising a series of short knitted courses arranged to form from two to four inwardly tapered gores, each gore consisting of an initial course of a length in the order of from 50 to 60 loops, and a series of courses successively shortened by one loop each at their inner ends and with a last short course of a length from 16 to 20 loops, said first and intermediate gores having loops added at the selvage edge thereof and with the first course of each next succeeding gore extending inwardly from said selvage edge to produce a heel fabric area of substantially even width and substantially increased length.

8. A stocking blank proportioned to be produced on a multiple section legger type full-fashioned hosiery knitting machine, comprising an ankle portion, a foot portion and right- and left-hand heel areas, each area comprising a series of short knitted courses arranged to form from two to four inwardly tapered gores, each gore consisting of an initial course of a length in the order of from 50 to 60 loops, and a series of courses successively shortened by one loop each at their inner ends and with a last short course of a length from 16 to 20 loops, said first and intermediate gores having loops added at the selvage edge thereof to a total number of eight to twelve loops, and with the first course of each succeeding gore extending inwardly from the selvage edge and terminating in a wale disposed outwardly from the innermost loop of the preceding gore by a number of loops substantially equal to the loops added for widening in the knitting of the preceding gore, and an initial long course of foot fabric connecting all of the terminal loops of the heel and instep fabric extending from one selvage to the other heel selvage.

9. A stocking blank comprising with the ankle and foot portions, left- and right-hand heel areas each comprising a plurality of inwardly tapered gores, each gore knitted with a long course forming one side thereof and with a short course and a series of terminal wale loops left by the successively shorter courses of the gore forming the other side thereof, and having the gores arranged with relation to one another in each instance with the long course side of one gore joining with the short course and terminal wale loop side of another gore, with the apex of each successively knitted gore originating in a loop of a different wale of the fabric and with groups of successively knitted courses forming said gores widened outwardly in steps to provide substantially even width heel fabric.

10. A stocking blank comprising with the ankle and foot portion, left- and right-hand heel areas, each comprising a plurality of inwardly tapered gores, each gore knitted with a long course forming one side thereof and with a short course and a series of terminal wale loops left by the successively shorter courses of the gore forming the other side thereof, and having the gores arranged with relation to one another in each instance with the long course side of one gore joining with the short course and terminal wale loop side of the next succeeding gore, with groups of successively knitted courses forming said gores widened outwardly in successive steps and with the remaining courses forming the bottom portion of a heel area knitted outwardly to the same extent to a same outer selvage wale to form substantially even width heel fabric of substantially greater length than width and rounded at the heel end, and having all of the terminal wale loops of the heel and ankle areas connected by a first course of foot fabric.

11. A stocking blank comprising with the ankle and foot portions, left- and right-hand heel areas comprising a plurality of inwardly tapered gores with the apex of each successively knitted gore originating in a loop of a different wale of the fabric and with the fabric courses forming said gores widened by adding wale loops to form a shaped heel fabric having a continuous selvage edge joining the foot portion of the fabric blank.

12. A stocking blank comprising an ankle portion, a foot portion and right- and left-hand heel areas, each such area including a series of successively shortened courses forming an inwardly tapered gore, the series of courses forming said gore being shortened by one loop in each successive course, alternate courses having at their inner ends reversing loops comprising a single full loop from which the yarn is directly connected to form a first full loop of the next succeeding course upon the adjacent wale outwardly disposed from said reversing loop.

13. A stocking blank comprising an ankle portion, a foot portion and right- and left-hand heel areas, each such area including a series of successively shortened courses terminating in a last short course forming an inwardly tapered gore knitted while substantially no knitting takes place upon the instep portion of the fabric, the series of courses forming said gore being shortened by one loop in each successive course, alternate courses having at their inner ends reversing loops comprising a single full loop from which the yarn is directly connected to form a first full loop of the next succeeding course upon the adjacent wale outwardly disposed from said reversing loop, and subsequently knitted course fabric connecting the loops of said short course and terminal wale loops of said gore to form the suture.

14. A stocking blank comprising an ankle portion, a foot portion and right- and left-hand heel areas, each such area comprising a series of successively shortened courses terminating in a last short course forming a plurality of inwardly tapered gores, the series of courses forming each gore being shortened by one loop in each successive course, alternate courses having at their inner ends reversing loops comprising a single full loop from which the yarn is directly connected to form a first full loop of the next succeeding course upon the adjacent wale outwardly disposed from said reversing loop, and relatively long course knitting connecting the loops of the last short course and terminal wale loops of the successively shortened courses of each successive gore to form the sutures.

15. A stocking blank comprising an ankle portion, a foot portion and right- and left-hand heel areas, each such area including a series of successively shortened courses forming a plurality of inwardly tapered gores, the series of courses forming said gores being shortened by one loop in each successive course, alternate courses having at their inner ends reversing loops comprising a single full loop from which the yarn is directly connected to form a first full loop of the next succeeding course upon the adjacent wale outwardly disposed from said reversing loop, certain of said gores having loops added at the selvage edge thereof, and each successive gore having the first long course thereof extending inwardly from said selvage edge to form a continuous selvage edge about the heel.

16. A stocking blank comprising an ankle portion, a foot portion and right- and left-hand heel areas, each comprising a number of inwardly tapered gores, at each side of the blank, with the first course of the first heel gore on one side of the blank being formed one course earlier than the first course of the first gore on the other side, both areas together forming substantially even width heel fabric with the innermost loop of each of certain of the succeeding heel courses forming the terminating loop of an adjacent outwardly considered wale, with additional loops, formed at intervals, at the outer selvages of the heel areas.

17. A stocking blank comprising an ankle portion, a foot portion and right- and left-hand heel areas, each comprising a number of tapered gores, the innermost loop of certain succeeding courses forming a terminating loop of such courses, these loops having drawn through them the loops of the first sole course, with the relatively longest course, of a gore on one side, occurring in the same course as the relatively shortest course on the other side, with a float of yarn formed at one side, between the short course of one gore and the long course of an adjoining gore.

18. A stocking blank comprising an ankle portion, heel areas and a foot portion, all fully formed of integrally connected fabric, with no appreciable instep fabric between the starting and ending courses of the heel areas, said areas being formed of successively knitted inwardly tapered gores, and with groups of successively knitted courses forming said gores widened outwardly in successive steps and with the remaining courses forming the bottom portion of a heel area knitted outwardly to the same extent to a same outer selvage wale to form substantially even width heel fabric of substantially greater length than width and rounded at the heel end, and having all of the terminal wale loops of the heel and ankle areas connected by a first course of foot fabric.

References Cited in the file of this patent

UNITED STATES PATENTS

| Number | Name | Date |
|---|---|---|
| 1,963,240 | Miller | June 19, 1934 |
| 2,475,447 | Colton | July 5, 1949 |

FOREIGN PATENTS

| Number | Country | Date |
|---|---|---|
| 26,199 | Great Britain | of 1909 |
| 155,100 | Germany | Oct. 4, 1904 |
| 338,377 | Germany | June 18, 1921 |